United States Patent
Estes et al.

(10) Patent No.: US 7,114,565 B2
(45) Date of Patent: Oct. 3, 2006

(54) MEASUREMENT-WHILE-DRILLING ASSEMBLY USING REAL-TIME TOOLFACE ORIENTED MEASUREMENTS

(75) Inventors: Robert A. Estes, Tomball, TX (US); Roland E. Chemali, Kingwood, TX (US)

(73) Assignee: Baker Hughes Incorporated, Houston, TX (US)

( * ) Notice: Subject to any disclaimer, the term of this patent is extended or adjusted under 35 U.S.C. 154(b) by 169 days.

(21) Appl. No.: 10/771,675

(22) Filed: Feb. 4, 2004

(65) Prior Publication Data

US 2004/0222019 A1 Nov. 11, 2004

Related U.S. Application Data

(63) Continuation-in-part of application No. 10/629,268, filed on Jul. 29, 2003.

(60) Provisional application No. 60/399,741, filed on Jul. 30, 2002, provisional application No. 60/408,308, filed on Sep. 5, 2002, provisional application No. 60/526,448, filed on Dec. 3, 2003.

(51) Int. Cl.
*E21B 45/00* (2006.01)

(52) U.S. Cl. ............... 166/255.2; 166/250.11; 166/66

(58) Field of Classification Search ............. 166/255.1, 166/255.2, 250.11, 66, 72, 40–45
See application file for complete search history.

(56) References Cited

U.S. PATENT DOCUMENTS

| | | | |
|---|---|---|---|
| 4,542,647 A * | 9/1985 | Molnar | 73/152.54 |
| 5,091,644 A | 2/1992 | Minette | 250/254 |
| 5,200,705 A | 4/1993 | Clark et al. | 324/338 |
| 5,325,714 A | 7/1994 | Lende et al. | 73/153 |
| 5,678,643 A * | 10/1997 | Robbins et al. | 175/45 |
| 5,899,958 A * | 5/1999 | Dowell et al. | 702/6 |
| 6,173,793 B1 | 1/2001 | Thomopson et al. | 175/45 |
| 6,215,120 B1 | 4/2001 | Gadcken et al. | 250/256 |
| 6,307,199 B1 | 10/2001 | Edwards et al. | 250/269.3 |
| 6,347,282 B1 | 2/2002 | Estes et al. | 702/6 |
| 6,453,239 B1 * | 9/2002 | Shirasaka et al. | 701/220 |

* cited by examiner

*Primary Examiner*—Frank Tsay
(74) *Attorney, Agent, or Firm*—Madan, Mossman & Sriram, P.C.

(57) ABSTRACT

This invention provides a measurement-while-drilling (MWD) downhole assembly for use in drilling boreholes which utilizes directional formation evaluation devices on a rotating assembly in conjunction with toolface orientation sensors. The data from the toolface orientation sensors are analyzed by a processor and toolface angle measurements are determined at defined intervals. Formation evaluation sensors operate substantially independently of the toolface orientation sensors and measurements of the formation evaluation sensors are analyzed in combination with the determined toolface angle to obtain formation parameters.

41 Claims, 16 Drawing Sheets

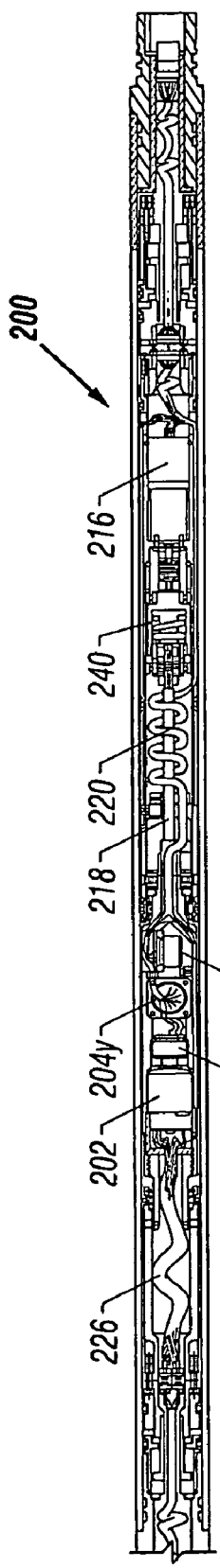
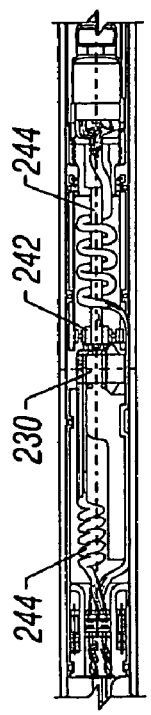
FIG. 2A  Prior art
FIG. 2B  Prior art

RPM

MEASUREMENT-WHILE-DRILLING ASSEMBLY USING REAL-TIME TOOLFACE ORIENTED MEASUREMENTS

CROSS REFERENCES TO RELATED APPLICATIONS

This application is a continuation in part of U.S. patent application Ser. No. 10/629,268 filed on Jul. 29, 2003 with priority claims to U.S. Provisional Patent Application Ser. No. 60/399,741 filed on Jul. 30, 2002 and U.S. Provisional Patent Application Ser. No. 60/408,308 filed on Sep. 5, 2002. The present application also claims priority from U.S. Provisional Patent Application Ser. No. 60/526,448 filed on Dec. 3, 2003.

FIELD OF THE INVENTION

This invention relates generally to assemblies for making toolface oriented measurements within a borehole and processing of such measurements to determine parameters of interest of materials around the borehole. The invention is described in the context of measurement-while-drilling applications for obtaining formation properties but the principles of analysis are equally applicable to measurements made with a wireline conveyed instrument.

BACKGROUND OF THE INVENTION

To obtain hydrocarbons such as oil and gas, wellbores (also called the boreholes) are drilled by rotating a drill bit attached at the end of a drilling assembly generally called the "bottom hole assembly" or the "drilling assembly." A large portion of the current drilling activity involves drilling highly deviated or substantially horizontal wellbores to increase the hydrocarbon production and/or to withdraw additional hydrocarbons from the earth's formations. The wellbore path of such wells is carefully planned before drilling such wellbores using seismic maps of the earth's subsurface and well data from previously drilled wellbores in the associated oil fields. Due to the very high cost of drilling such wellbores and the need precisely to place such wellbores in the reservoirs, it is essential continually to determine the position and direction of the drilling assembly and thus the drill bit during drilling of the wellbores. Such information is used, among other things, to monitor and adjust the drilling direction of the wellbores.

In drilling assemblies used until recently, the directional package commonly includes a set of accelerometers and a set of magnetometers, which respectively measure the earth's gravity and magnetic field. The drilling assembly is held stationary during the taking of the measurements from the accelerometers and the magnetometers. The toolface and the inclination angle are determined from the accelerometer measurements. The azimuth is then determined from the magnetometer measurements in conjunction with the tool face and inclination angle.

The earth's magnetic field varies from day to day, which causes corresponding changes in the magnetic azimuth. The varying magnetic azimuth compromises the accuracy of the position measurements when magnetometers are used. Additionally, it is not feasible to measure the earth's magnetic field in the presence of ferrous materials, such as casing and drill pipe. Gyroscopes measure the rate of the earth's rotation, which does not change with time nor are the gyroscopes adversely affected by the presence of ferrous materials. Thus, in the presence of ferrous materials the gyroscopic measurements can provide more accurate azimuth measurements than the magnetometer measurements. U.S. Pat. No. 6,347,282 to Estes et al having the same assignee as the present application and the contents of which are fully incorporated herein by reference, discloses a measurement-while-drilling (MWD) downhole assembly for use in drilling boreholes that utilizes gyroscopes, magnetometers and accelerometers for determining the borehole inclination and azimuth during the drilling of the borehole. The downhole assembly includes at least one gyroscope that is rotatably mounted in a tool housing to provide signals relating to the earth's rotation. A device in the tool can rotate the gyroscope and other sensors on the tool at any desired angle. This ability to rotate the sensors is important in determining bias in the sensors and eliminating the effects of the bias.

U.S. Pat. No. 5,091,644 to Minette having the same assignee as the present application teaches a method for analyzing data from a measurement-while-drilling (MWD) gamma ray density logging tool which compensates for rotations of the logging tool (along with the rest of the drillstring) during measurement periods. In accordance with the method disclosed therein, the received signal is broken down into a plurality of sections. In a preferred embodiment, the Minette invention calls for the breaking of the signal from the formation into four different sections: top, bottom, right, left. As the tool rotates, it passes through these four quadrants. Each time it passes a boundary, a counter is incremented, pointing to the next quadrant. This allows for dividing the data into four spectra for each detector. Each of these four spectra will be obtained for ¼th of the total acquisition time assuming constant rotational speed.

U.S. Pat. No. 6,307,199 to Edwards et al teaches the use of a density gamma ray logging device in which data from different "azimuthal" sectors are combined to give an interpretation of formation dip. The primary emphasis in both the Minette and Edwards patent is to correct the density measurements for the effects of standoff; the sensors themselves are not specifically designed for "azimuthal" sensitivity. U.S. Pat. No. 6,215,120 to Gadeken et al. discloses the use of "azimuthally" focused gamma ray sensors on a logging tool for detecting "azimuthal" variations in the gamma ray emission from earth formations.

Other types of images have been obtained in the prior art using sensors on a rotating bottom hole assembly (BHA). For example, U.S. Pat. No. 5,200,705 to Clark et al. discusses resistivity measurements made by a galvanic resistivity sensor on a stabilizer blade. U.S. Pat. No. 6,173,793 to Thompson et al., having the same assignee as the present invention and the contents of which are fully incorporated herein by reference, teaches the use of pad mounted sensors on a slowly rotating sleeve for obtaining azimuthal resistivity images of the borehole wall. Resistivity images can, for the purpose of the present invention, be considered to be similar to images obtained with a nuclear logging tool, albeit with a much higher resolution. Resistivity measurements do not suffer from the statistical variability associated with nuclear logging tools and can hence make virtually instantaneous measurements yielding images with a much higher resolution than can nuclear measurements.

We digress briefly on a matter of terminology. In surveying, the term "azimuth" usually refers to an angle in a horizontal plane, usually measured from north: when referenced to magnetic north, it may be called magnetic azimuth and when referenced to true north, it is usually simply termed azimuth. It would be clear based on this definition that all measurements made in a highly deviated borehole or a horizontal borehole would be made with substantially the same azimuth. Accordingly, in the present application, we use the more accurate term "tool face angle" to define a relative orientation in a plane orthogonal to the borehole axis. With this definition, the Minette, Edwards and Gadeken patents are really making measurements over a variety of tool face angles.

Common to the Minette, Edwards and Gadeken patents is the use of a controller that keeps track of the rotating sensor assembly and controls the acquisition of data based on sector boundaries in the tool face angle. While this may not be difficult to do for the case of a single directionally sensitive sensor, the problem becomes much more complicated when a plurality of different types of sensors are conveyed as part of a bottom hole assembly. It is difficult, if not impossible, for a single controller to keep track of a plurality of sensor assemblies during rotation of the downhole assembly and control the operation of a plurality of assemblies. A source of error is the nonuniform rotation speed of the drillstring. Another source of error is the time delay inherent in the electronics. Measurements may be made simultaneously by the formation sensor and the orientation sensors, but there is a time delay between the time the measurements are made with the two types of sensors and the time at which they are processed. The interaction between the two sources of error, i.e., nonuniform rotation and time delay, can be fairly complex. The problem of nonuniform rotation is partially addressed in copending U.S. patent application Ser. No. 10/629,268 of Cairns et.al. having the same assignee and the contents of which are fully incorporated herein by reference. However, addressing the non-uniform rotation by itself gives only a partial solution. In addition, there is the problem of bias in the orientation sensor measurements. Generally, magnetometers are preferred as orientation sensors over gyroscopes, but magnetometers are susceptible to errors causes by metallic drill collars, casing, and accumulated debris. There is a need for a method of determining accurate orientation values using measurements made by a an orientation sensor on a MWD logging tool. It would be desirable to have an apparatus and a method that efficiently controls data acquisition and possibly processing with a plurality of rotating sensors in a downhole device. The present invention satisfies this need.

SUMMARY OF THE INVENTION

One embodiment of the present invention includes a rotatable downhole assembly adapted for conveying in a borehole and determining a parameter of interest of a medium near to the borehole. The downhole assembly includes a first sensing device such as a gyroscope, a magnetometer, and/or an accelerometer, for providing a measurement indicative of the toolface angle of the downhole assembly, and an associated processor. The downhole assembly also includes a directional formation evaluation device for providing measurements indicative of a parameter of interest of the medium. The directional evaluation device is associated with a second processor. The first processor provides processed data about the toolface orientation to a common bus operatively connected to the first processor and the second processor. In one embodiment of the invention, a gyroscope is used to provide information about the location of the assembly. The assembly may be conveyed on a drillstring, coiled tubing or on a wireline.

In one embodiment of the invention, the directional device is a formation evaluation device. One or more gamma ray sensors may be used. The formation evaluation device may be operated independently of the orientation sensor. With this arrangement, a plurality of formation evaluation sensors may be used. Subsequent processing relates the measurements of the formation evaluation sensors to toolface angle and provides information about downhole parameters.

Apparent and relative dip angles of the borehole with respect to an interface in the earth formations may be determined. The rate of penetration needed for this determination may be obtained using downhole accelerometers, a pair of formation evaluation sensors at a known spacing, or telemetered from the surface. These determined dip angles may be used for controlling the drilling direction.

BRIEF DESCRIPTION OF THE DRAWINGS

For detailed understanding of the present invention, references should be made to the following detailed description of the present invention, taken in conjunction with the accompanying drawings, in which like elements have been given like numerals, wherein:

FIG. 2a, 2b (prior art) shows a schematic diagram of a portion of the bottomhole assembly with a set of gyroscopes and a corresponding set of accelerometers according to a preferred embodiment of the present invention;

FIG. 22 shows unwrapped resisitivity measurements as a function of depth.

DETAILED DESCRIPTION OF THE INVENTION

Figure 1:
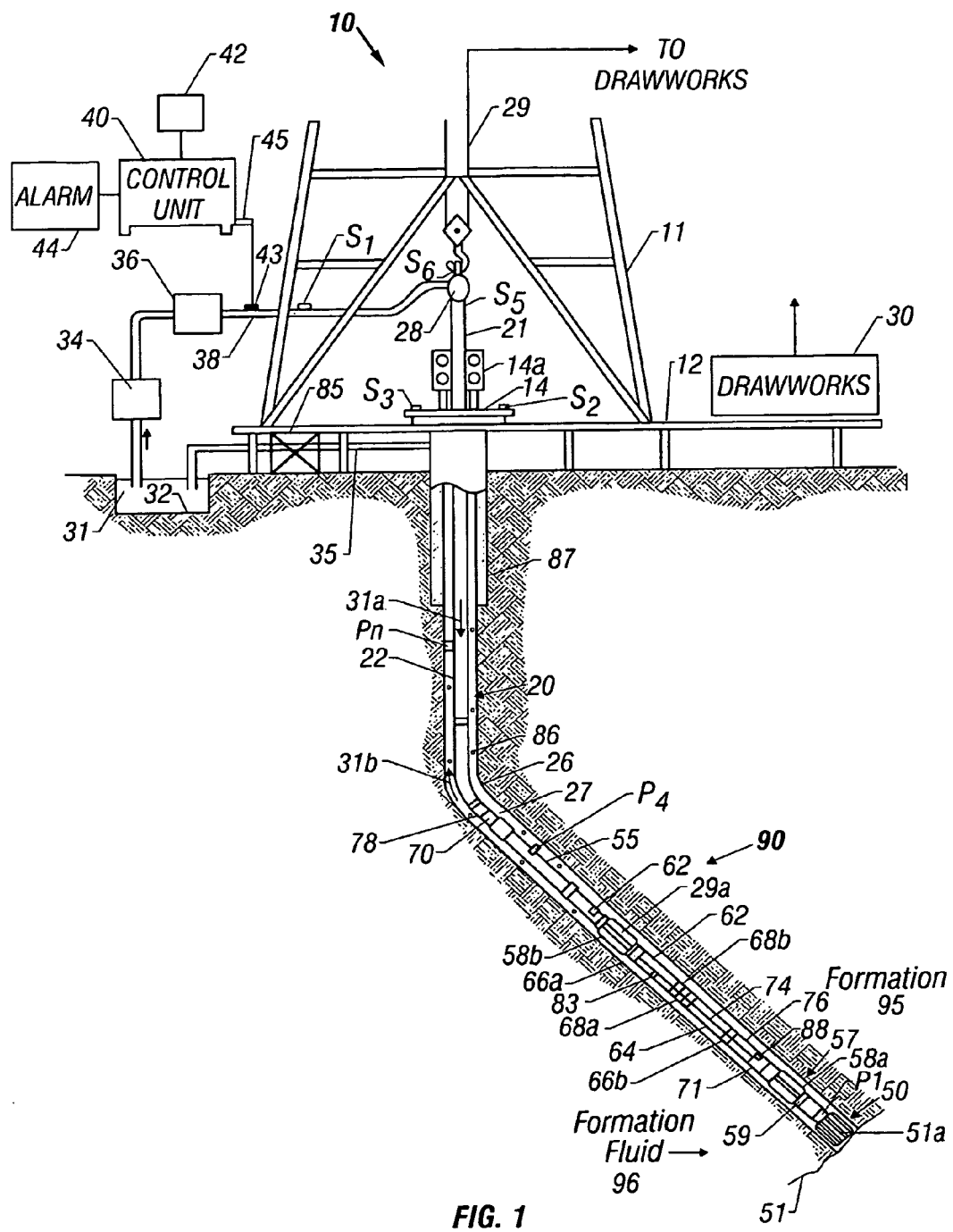
FIG. 1 (prior art) shows a schematic diagram of a drilling system that includes the apparatus of the current invention in a measurement-while-drilling embodiment.

The present invention is described with reference to a drilling assembly, although many of the methods of the present invention are also applicable with logging tools conveyed on a wireline and may also be used in cased boreholes. FIG. 1 shows a schematic diagram of an exemplary drilling system 10 such as that disclosed by Estes. The drilling system has a bottom hole assembly (BHA) or drilling assembly 90 that includes gyroscope. For some of the applications of the present invention, a gyroscope is not essential. The BHA 90 is conveyed in a borehole 26. The drilling system 10 includes a conventional derrick 11 erected on a floor 12 which supports a rotary table 14 that is rotated by a prime mover such as an electric motor (not shown) at a desired rotational speed. The drill string 20 includes a tubing (drill pipe or coiled-tubing) 22 extending downward from the surface into the borehole 26. A drill bit 50, attached to the drill string 20 end, disintegrates the geological formations when it is rotated to drill the borehole 26. The drill string 20 is coupled to a drawworks 30 via a kelly joint 21, swivel 28 and line 29 through a pulley (not shown). Drawworks 30 is operated to control the weight on bit ("WOB"), which is an important parameter that affects the rate of penetration ("ROP"). A tubing injector 14a and a reel (not shown) are used as instead of the rotary table 14 to inject the BHA into the wellbore when a coiled-tubing is used as the conveying member 22. The operations of the drawworks 30 and the tubing injector 14a are known in the art and are thus not described in detail herein.

During drilling, a suitable drilling fluid 31 from a mud pit (source) 32 is circulated under pressure through the drill string 20 by a mud pump 34. The drilling fluid passes from the mud pump 34 into the drill string 20 via a desurger 36 and the fluid line 38. The drilling fluid 31 discharges at the borehole bottom 51 through openings in the drill bit 50. The drilling fluid 31 circulates uphole though the annular space 27 between the drill string 20 and the borehole 26 and returns to the mud pit 32 via a return line 35 and drill cutting screen 85 that removes the drill cuttings 86 from the returning drilling fluid 31b. A sensor $S_1$ in line 38 provides information about the fluid flow rate. A surface torque sensor $S_2$ and a sensor $S_3$ associated with the drill string 20 respectively provide information about the torque and the rotational speed of the drill string 20. Tubing injection speed is determined from the sensor $S_5$, while the sensor $S_6$ provides the hook load of the drill string 20.

In some applications the drill bit 50 is rotated by only rotating the drill pipe 22. However, in many other applications, a downhole motor 55 (mud motor) is disposed in the drilling assembly 90 to rotate the drill bit 50 and the drill pipe 22 is rotated usually to supplement the rotational power, if required, and to effect changes in the drilling direction. In either case, the ROP for a given BHA largely depends on the WOB or the thrust force on the drill bit 50 and its rotational speed.

The mud motor 55 is coupled to the drill bit 50 via a drive disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the mud motor 55 and the reactive upward loading from the applied weight on bit. A lower stabilizer 58a coupled to the bearing assembly 57 acts as a centralizer for the lowermost portion of the drill string 20.

A surface control unit or processor 40 receives signals from the downhole sensors and devices via a sensor 43 placed in the fluid line 38 and signals from sensors $S_1$–$S_6$ and other sensors used in the system 10 and processes such signals according to programmed instructions provided to the surface control unit 40. The surface control unit 40 displays desired drilling parameters and other information on a display/monitor 42 that is utilized by an operator to control the drilling operations. The surface control unit 40 contains a computer, memory for storing data, recorder for recording data and other peripherals. The surface control unit 40 also includes a simulation model and processes data according to programmed instructions. The control unit 40 is preferably adapted to activate alarms 44 when certain unsafe or undesirable operating conditions occur.

The BHA may also contain formation evaluation sensors or devices for determining resistivity, density and porosity of the formations surrounding the BHA. A gamma ray device for measuring the gamma ray intensity and other nuclear and non-nuclear devices used as measurement-while-drilling devices are suitably included in the BHA 90. As an example, FIG. 1 shows a resistivity measuring device 64. It provides signals from which resistivity of the formation near or in front of the drill bit 50 is determined. The resistivity device 64 has transmitting antennae 66a and 66b spaced from the receiving antennae 68a and 68b. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole computer 70 to determine the resistivity and dielectric values.

An inclinometer 74 and a gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, position sensors, such as accelerometers, magnetometers or gyroscopic devices may be disposed in the BHA to determine the drill string azimuth, true coordinates and direction in the wellbore 26. Such devices are known in the art and are not described in detail herein.

In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place. The above described resistivity device, gamma ray device and the inclinometer are preferably placed in a common housing that may be coupled to the motor. The devices for measuring formation parameters such as porosity, permeability, resistivity and density (collectively designated by numeral 78) are preferably placed above the mud motor 55. Such devices are known in the art and are thus not described in any detail.

As noted earlier, a large portion of the current drilling systems, especially for drilling highly deviated and horizontal wellbores, utilize coiled-tubing for conveying the drilling assembly downhole. In such application a thruster 71 is deployed in the drill string 90 to provide the required force on the drill bit. For the purpose of this invention, the term weight on bit is used to denote the force on the bit applied to the drill bit during the drilling operation, whether applied by adjusting the weight of the drill string or by thrusters. Also, when coiled-tubing is utilized the tubing is not rotated by a rotary table, instead it is injected into the wellbore by a suitable injector 14a while the downhole motor 55 rotates the drill bit 50.

A number of sensors are also placed in the various individual devices in the drilling assembly. For example, a variety of sensors are placed in the mud motor power section, bearing assembly, drill shaft, tubing and drill bit to determine the condition of such elements during drilling and to determine the borehole parameters. The preferred manner of deploying certain sensors in drill string 90 will now be described. The actual BHA utilized for a particular application may contain some or all of the above described sensors. For the purpose of this invention any such BHA could contain one or more gyroscopes and a set of accelerometers (collectively represented herein by numeral 88) at a suitable location in the BHA 90. A preferred configuration of such sensors is shown in FIG. 2a.

FIG. 2 is a schematic diagram showing an orientation sensor section 200 containing a gyroscope 202 and a set of three accelerometers 204x, 204y and 204z disposed at a suitable location in the bottomhole assembly (90 in FIG. 1) according to one embodiment of the present invention. The gyroscopes 202 may be a single axis gyroscope or a two-axis gyroscope. In vertical and low inclination wellbores, an x-axis and a y-axis gyroscope are deemed sufficient for determining the azimuth and toolface with respect to the true north. The configuration shown in FIG. 2 utilizes a single two-axis (x-axis and y-axis) gyroscope that provides outputs corresponding to the earth's rate of rotation in the two axis perpendicular to the borehole axis or the bottomhole assembly longitudinal axis, referred to herein as the z-axis. The sensor 202 thus measures the earth's rotation component in the x-axis and y-axis. The accelerometers 204x, 204y and 204z measure the earth's gravity components respectively along the x, y, and z axes of the bottomhole assembly 90.

The gyroscope 202 and accelerometers 204x–204z are disposed in a rotating chassis 210 that rotates about the radial bearings 212a–212b in a fixed or non-rotating housing 214. An indexing drive motor 216 coupled to the rotating chassis 210 via a shaft 218 can rotate the chassis 210 in the bottomhole assembly 90 about the z-axis, thus rotating the gyroscopes 202 from one mechanical position to another position by any desired rotational angle. A stepper motor is preferred as the indexing drive motor 216 because stepper motors are precision devices and provide positive feedback about the amount of rotation. Any other mechanism, whether electrically-operated, hydraulically-operated or by any other desired manner, may be utilized to rotate the gyroscopes within the bottomhole assembly 90. The gyroscope 202 may be rotated from an initial arbitrary position to a mechanical stop (not shown) in the tool or between two mechanical stops or from an initial peak measurement to a second position as described later. The rotational angle corresponding to a particular axis is selectable.

Although FIG. 2 shows a single two axis gyroscope, a separate gyroscope may be utilized for each axis. A wiring harness 226 provides power to the gyroscope 202 and accelerometers 204x, 204y, 204z. The wiring harness 226 transmits signals from the gyroscope and accelerometers to the processor in the bottomhole assembly 90. Similarly, a suitable wiring harness 220 provides power and signal linkage to the stepper motor 216 and additional downhole equipment. A spring loaded torque limiter 240 may be used to prevent inertial loading caused by drillstring rotation from damaging the gearbox of the stepper motor 216.

In addition a second two-axis (x-axis and z-axis) gyroscope 230 may be rotatably mounted in the bottomhole assembly 90 in a rotating chassis or in any other manner to measure the rate of rotation in the z-axis and the x-axis, as shown in FIG. 2b. The sensor 230 could be rotated about the y-axis using a bevel gear 242 and a shaft linkage 244 to the rotating chassis 210, thus eliminating the need for an additional motor. The wiring harness 244 for the y-axis gyro 230 must be spooled around the gyro to accommodate the space available in a small diameter housing.

Figure 3:
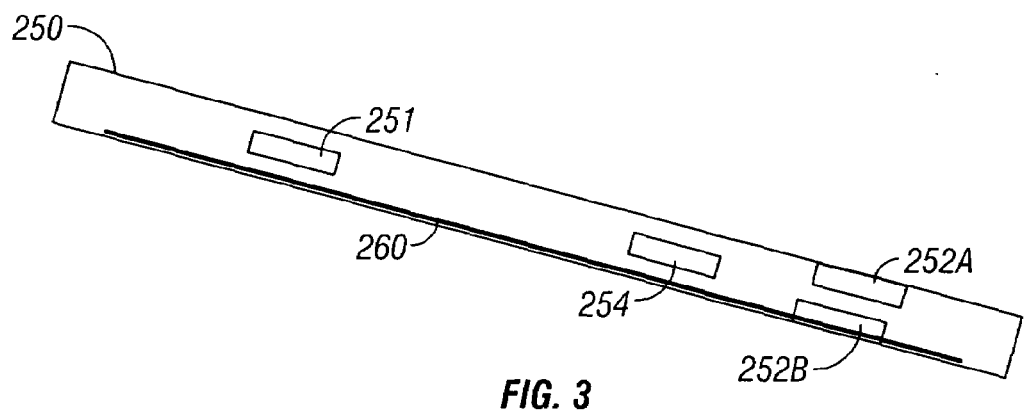
FIG. 3 shows an orientation sensor assembly and a dual detector gamma ray sensor.

The present invention is first described with reference to a nuclear sensor. Turning now to FIG. 3, details of a gamma ray sensor that is part of the sensor assembly 78 mentioned above are shown. A preferred gamma ray logging device comprising two gamma ray sensors 252a, 252b is shown along with an orientation sensor assembly 250. The orientation sensor assembly may include all the elements of the gyro-MWD device described above, but the some aspects of the method of the present invention may also be practiced with only orientation sensors such as accelerometers and or magnetometers. FIG. 3 also shows a processor 251 associated with the orientation/navigation sensor assembly. In a preferred embodiment of the invention, the primary purpose of the processor 251 is to process signals from the orientation/navigation sensor assembly 250. Also shown in FIG. 3 is a processor 254 associated with the gamma ray sensors. It should also be noted that for certain uses of the method of the present invention, only one gamma ray sensor may be sufficient.

In a preferred embodiment of the invention, two gamma ray detectors spaced 180° apart are used. When two detectors are used, the counts from the two may be combined. In a preferred embodiment of the invention, the processors 251 and 254 operate at an update frequency of approximately 60 Hz. The counts from the gamma ray sensor(s) are accumulated at a sample rate of 16.67 ms. This is done regardless of the actual rotation speed of the assembly. Other sample rates may be used, but a requirement is that it be fixed.

The "tick" size is defined as the change in the toolface angle over one time sample interval. The tick size increases with rotation speed and limits the resolution of the method and apparatus of the present invention. However, as discussed below, the effect of tick size can be substantially eliminated.

In a preferred embodiment of the invention, each detector has an intrinsic resolution of ±35°. This is determined by the shielding that is provided for the gamma ray detectors. In the method of the present invention, the data are binned into finite bins with a defined angular size, preferably 45°. The finite bin size further limits the angular resolution. Increasing the number of bins improves the angular resolution up to a point beyond which the poor statistics of gamma ray counts degrade the measurements.

An important feature of the apparatus of the present invention is a common bus, designated generally as 260. The various processors (251 and 254 in FIG. 3) output their processed data to the bus. The bus is also connected to a telemetry device (not shown) at a suitable location for two-way communication. In an alternate embodiment of the present invention, two-way communication between the bottom hole assembly and the surface controller may be accomplished using flowable devices carried by the drilling fluid. Such flowable devices are taught in U.S. patent application Ser. No. 09/578,623 (now U.S. Pat. No. 6,443, 228) of Aronstam et al, having the same assignee as the present application and the contents of which are fully incorporated herein by reference.

Figure 4:
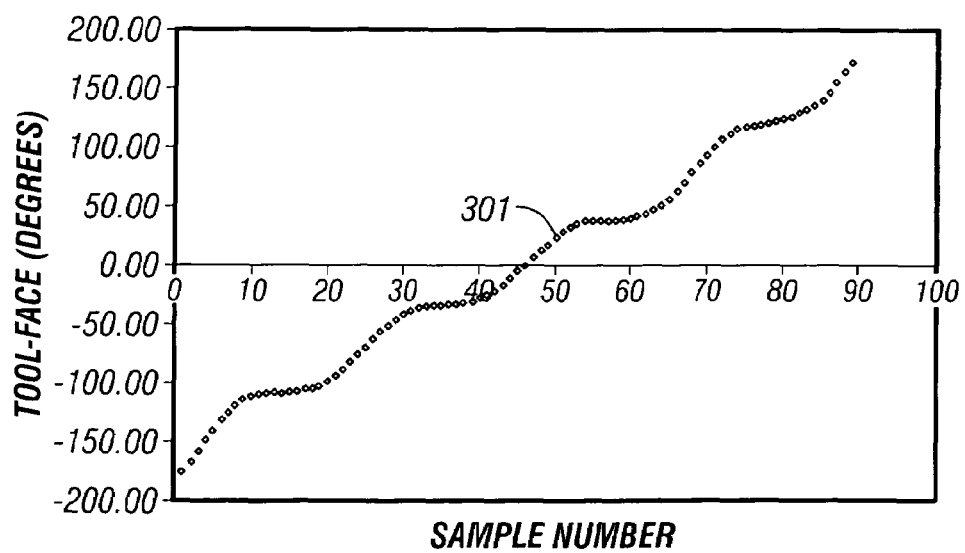
FIG. 4 shows the tool face angle as a function of time.

The advantage of having a common bus 260 is that the processor 251 can process data from the orientation/navigation sensor independently of the processing of data from the gamma ray sensor(s) 252a, 252b by the processor 254. As would be known to those versed in the art, it is not uncommon for the rotation speed to be non-uniform. The processor 251 continues to process the data from the orientation sensor and outputs the toolface angle as a function of time to the bus 260. An advantage of having the common bus is that any additional directional evaluation devices could also operate independently of the orientation/navigation sensor assembly. As a result of this independent operation, a plot of the toolface angle as a function of sample number such as that shown in FIG. 4 may be obtained. The manner in which this is obtained is discussed next.

Figure 5:
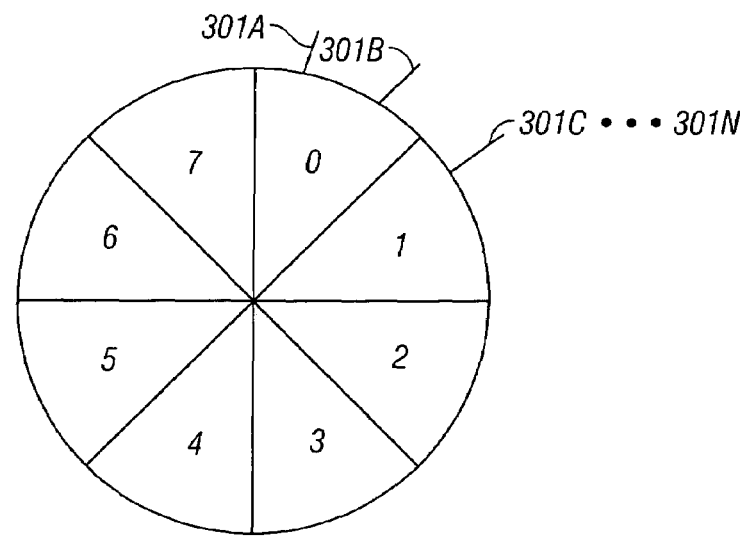
FIG. 5 shows an azimuthal display of time ticks.

Turning now to FIG. 5, eight sectors of tool face angles are shown, numbered 0, 1, 2, 3, 4, 5, 6 and 7. The use of eight sectors is optional and more or fewer sectors may be used. Also shown are ticks labeled as 301a, 301b, 301c . . . 301n. As noted above, the particular positions of the ticks are not known at the time the gamma ray sensor is making measurements- these are determined after the fact using information from the orientation sensors. The provide values of the toolface angle at discrete times. The toolface angle at intermediate times may be determined by interpolation; in a preferred embodiment of the invention, linear interpolation is used.

Figure 6:
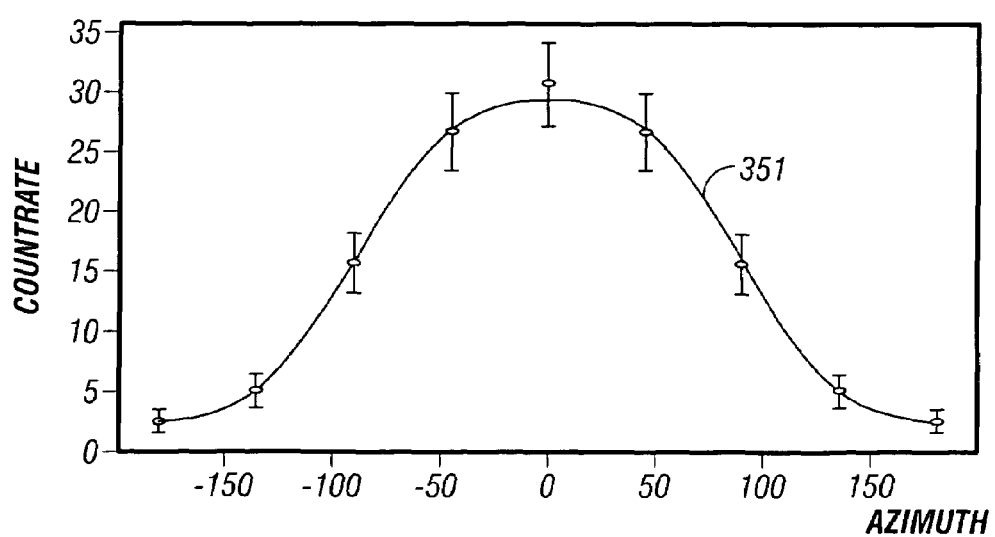
FIG. 6 illustrates the azimuthal resolution of an exemplary gamma ray directional logging tool.

There are a number of factors that limit the resolution of the method of the present invention in terms of tool face angle. The first limit is determined by the static resolution of the gamma ray sensors. The static resolution is the ability to resolve two point sources of gamma rays and is defined as the resolution that is achievable with an infinitely long acquisition time (i.e., so that statistical fluctuations are eliminated). FIG. 6 shows an example of a tool response function as a function of toolface angle. Typically, it is a Gaussian function with a half-width determined by the shielding provided for the detectors.

The actual resolution is obtained by convolving the static resolution with a bin window and the tick window; the actual resolution is thus poorer than the static resolution. Increasing the number of bins while maintaining the acquisition time $T_{acq}$ constant does not increase the overall resolution due to the fact that the statistical fluctuations within a bin become larger.

Figure 7:
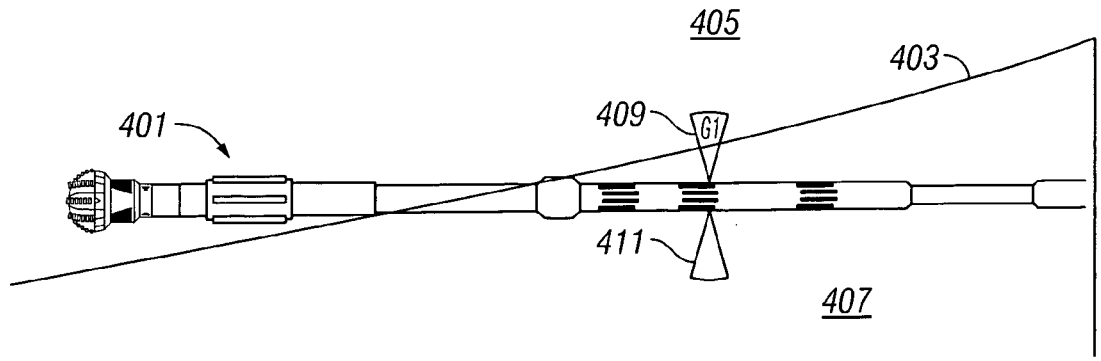
FIG. 7 illustrates the configuration of the apparatus of the present invention for determining relative angle with respect to a bed boundary.

Turning now to FIG. 7, an example of the use of the method of the present invention is shown. Shown is the apparatus of the present invention 401 including at least one gamma ray detector with region of sensitivity in the "up" and "down" direction shown by 409, 411. For simplifying the illustration, in FIG. 7 it is assumed that the normal to the boundary 403 between formations 405 and 407 lies in a vertical plane so that "up" and "down" directions in FIG. 7 correspond to a combination of sectors (0,7) and (3,4) in FIG. 5 respectively. The at least one gamma ray detector could comprise a pair of detectors. The data received by the at least one detector can then be processed to get gamma ray counts in the "up" and "down" directions respectively. When only one detector is use, then the combination of measurements from, say sectors 0 and 7 (see FIG. 5) is an "up" measurement while the measurements from sectors 3 and 4 give a "down" measurement. When two detectors are used, their respective measurements in the "up" and "down" directions may be combined to improve the signal to noise ratio.

The apparatus is shown crossing the bed boundary 403 between two earth formations 405, 407. For illustrative purposes, assume that formation 405 comprises a shale while 407 comprises a sand. For the configuration shown, the "up" gamma ray count will be greater than the "down" gamma ray count. The increased count is due to the fact that the gamma ray sensors have a limited azimuthal sensitivity and the potassium present in the shale is a significant source of gamma rays.

Figure 8:
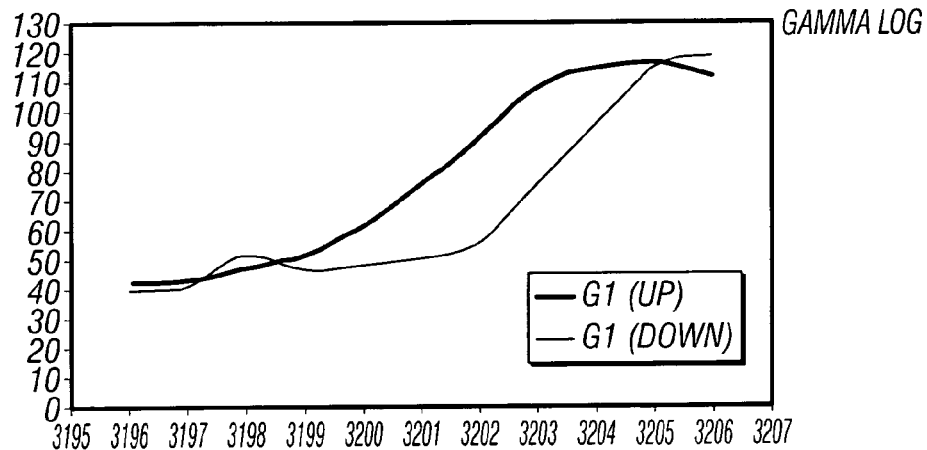
FIG. 8 illustrates the directional measurements made by the apparatus as shown in FIG. 7.

By measuring both the "up" and "down" gamma ray counts as a function of depth, a plot shown in FIG. 8 results. Shown are the measurements made by the "up" and "down" gamma ray sensors. The abscissa is the borehole depth (actual depth, not true vertical depth) and the ordinate is the gamma ray count. In an optional embodiment of the invention, the rate of penetration (ROP) of the assembly in the borehole is determined using signals from the axial component accelerometer. Such a method is disclosed in U.S. patent application Ser. No. 10/167,332 of Dubinsky et al, filed on Jun. 11, 2002 and the contents of which are fully incorporated herein by reference. Another method of depth determination is disclosed in U.S. Pat. No. 5,896,939 to Witte et al., having the same assignee as the present invention, uses a computer housed in the drilling tool and pre-programmed with the data of the planned pattern of the borehole. Changes in the drilling mud pressure or flow of the drilling mud are detected by a downhole sensor and are used as a counter for the number of drilling string segments used. This, together with the known length of a drilling string segment, enables the computer to calculate the depth of the BHA. However, any suitable method for determining the ROP may be used.

The horizontal separation between the two curves is an indication of the relative angle at which the borehole crosses the bed boundary: the larger the separation, the smaller the angle. Using knowledge of the tool response function, this angle can be determined.

In general, however, bed boundary may have an arbitrary orientation and the maximum gamma ray count need not correspond to the "up" direction of the tool (sectors 0,7 in FIG. 5). The gamma ray count Ψ in a deviated borehole as a function of the toolface angle φ can be approximated by the function $$\Psi^M \approx \sum_{m=0}^{M} \Psi_m \cos\left[m(\phi - \phi_0)\right] \quad (1)$$

Such a function satisfies two requirements of the gamma ray count: it must be a periodic function with a period of 360°, and it must be symmetric with respect to the angle $\phi_0$ which is the toolface angle at which the detector is closest to a bed boundary. Note that the example of FIGS. 7 and 8 is a special case when the normal to the bed boundary is in a vertical plane. It should also be noted that proximity to a bed boundary is not the only cause that will produce a variation of the form given by eq. (1); a similar results follows from a radial fracture extending out from the borehole.

To reconstruct the distribution with M terms, it is necessary to have the number of bins of data $N_{bins} > 2(M-1)+1$. Hence to determine a three term expansion in eq. (1), at least 5 bins are necessary.

Figure 9:
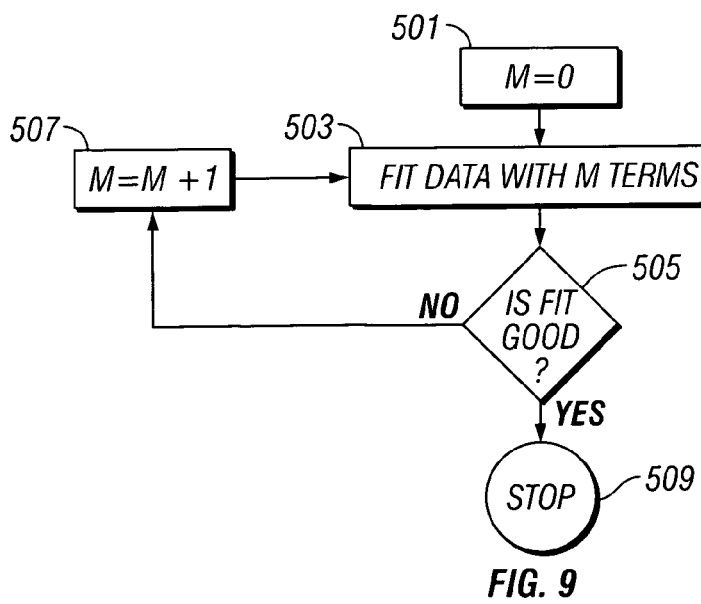
FIG. 9 illustrates a flow chart of the method used for characterizing the toolface-angle dependent data in a series expansion.

Turning next to FIG. 9, the method of the present invention is illustrated by the flow chart. Starting at 501, a model with M=0 is defined, i.e., there is no variation with toolface angle of the gamma ray count. This corresponds to a model in which $$\Psi = \text{Const} = \Psi_0 \qquad (2)$$

A check is made to see if, based on the number of data points, the observations can be adequately described by a constant 505 to within a defined probability. If the answer is "yes", then the process terminates and there is no variation with toolface angle of the data.

If the answer at 505 is "No", then M is incremented 507 and a two term expansion is made. This requires determination of the angle $\phi_0$. A first estimate of the angle $\phi_0$ is obtained as the average of the data $$\hat{\phi}_0 = \frac{\sum_{k=1}^{N_{bins}} n_k \phi_k}{\sum_{k=1}^{N_{bins}} n_k}. \qquad (3)$$

The data are then rotated about the angle estimated from eq. (3) and a two term fit is made to obtain $\Psi_0$ and $\Psi_1$ according to eq. (1). Keeping these determined values of $\Psi_0$ and $\Psi_1$, a new estimate of $\phi_0$ is made. A check is again made of the goodness of fit 505 and again, if the fit is good enough. the process terminates 509 and if the fit is not good enough, an additional term is added to the curve fitting.

In order to improve the statistics on the measurements, averaging of the measurements over a depth window may also be used. As noted above, the method of Dubinsky discloses a method of using an axial accelerometer for determining the depth of the tool In the present invention, the method of Dubinsky is preferred for determining the depth of the assembly and defining the depth window over which averaging may be done, although other methods for depth determination may be used.

In most situations, gamma ray data will not have the necessary resolution to use the higher order terms of the expansion given by eq. (1). Hence in a preferred embodiment of the invention, only a single term of the expansion given by eq. (1) is used. The method illustrated in FIG. 9 may be used for processing of image data. This is illustrated in FIGS. 10*a*, 10*b*.

Figures 10A, 10B:
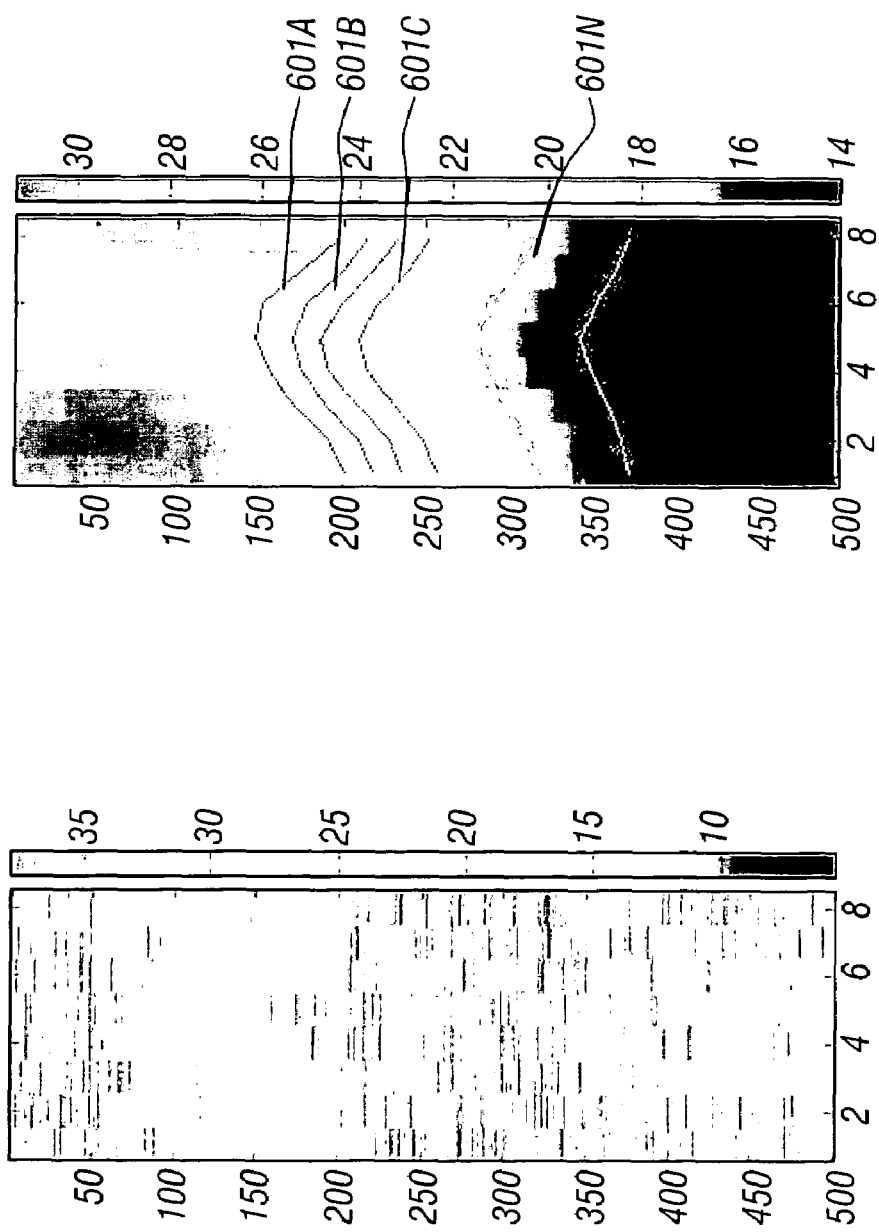
FIG. 10 shows an example of processing of the data using the method of the present invention.

Shown in FIG. 10*a* are raw data acquired downhole. The vertical axis represents time (or depth) and the horizontal axis shows the sectors. In this particular example, eight sectors were used. The display may be a color display or may be a black and white display of the gamma ray counts as a function of time (or depth) and the azimuth (sector). Following the curve fitting (using the cosine distributions as discussed above) of the data at a selected time (or depth),
partially processed data (and a partially processed image), not shown, may be obtained. The partially processed data are than low pass filtered in the vertical direction (time or depth). The filtered image may be quantized into different levels and the resulting image displayed on a color display or a gray scale. This may be referred to as a processed image. An example of this is shown in FIG. 10*b*. Also shown in FIG. 10*b* are contours such as 601*a*, 601*b*, 601*c* . . . 601*n*. In a display such as FIG. 10*b*, these contours represent dipping boundaries that intersect the borehole at an angle.

Figure 11:
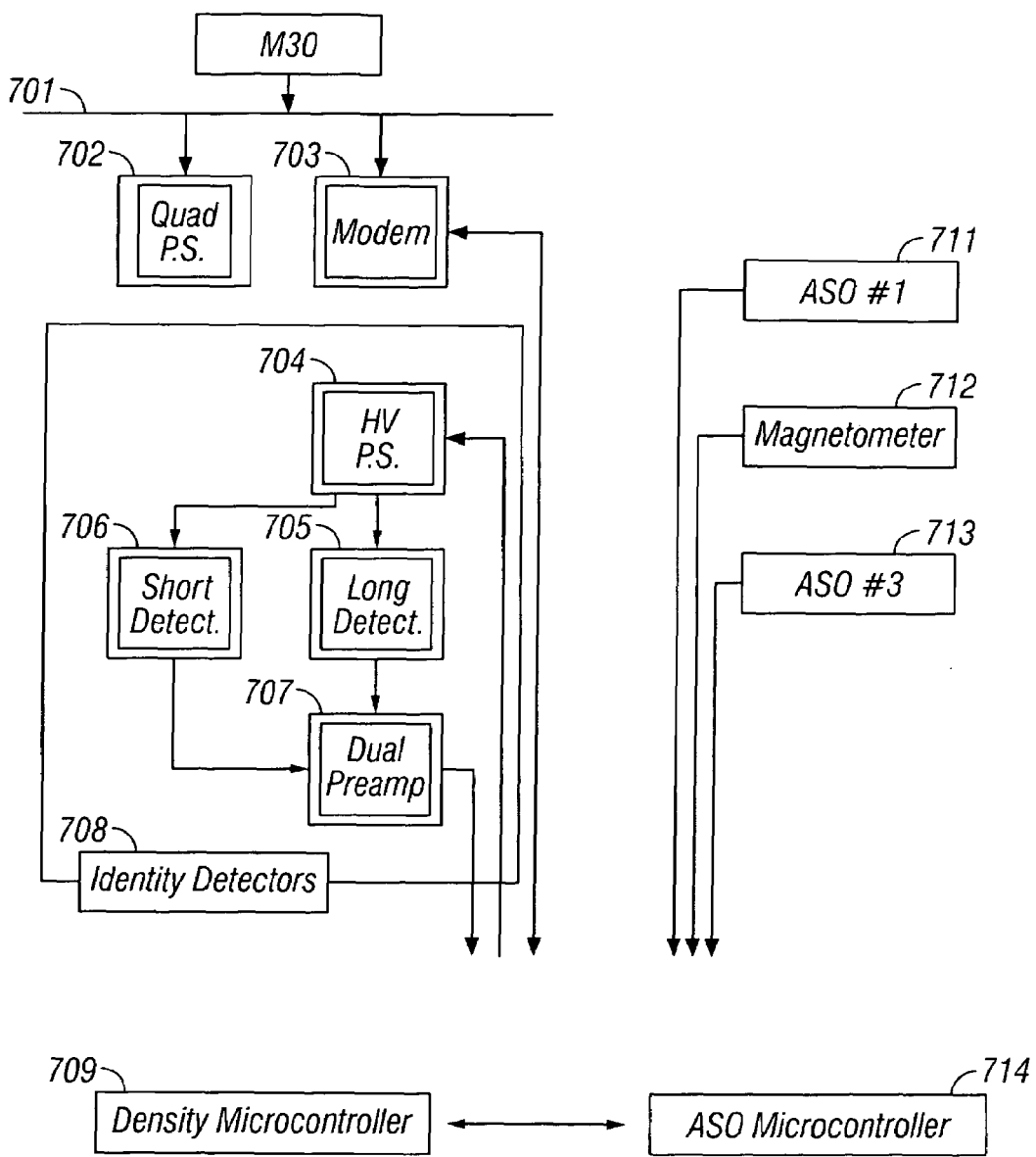
FIG. 11 shows a block diagram of an apparatus for making nuclear measurements as a function of azimuth.

Turning now to FIG. 11, a block diagram of equipment used for determination of density by azimuthal sectors is shown. The microprocessor used for controlling density measurements is denoted by 709 while the microprocessor used for azimuth and stand off measurements is indicated by 714. The density measuring device 708 includes a source of nuclear radiation, two detectors denoted by 705 and 706, and the detectors power supply 704. The detectors 705 and 706 are called the LS and SS detectors (for long spaced and short spaced). A preamplifier for the output of the LS and SS detectors is denoted by 707. Also shown is a common system bus 701, and a modem 703. It should be noted that additional detectors could also be used. Operation of the density measuring device is known in the art and is not discussed further. For the purposes of the present invention, counts made by the LS and SS detectors are accumulated by azimuthal sectors while the MWD tool is rotating.

Figure 12:
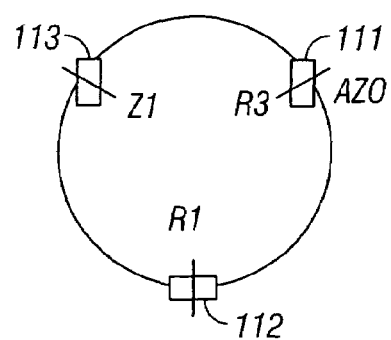
FIG. 12 shows a illustrating standoff and orientation sensors in a cross sectional view.

The standoff/azimuth determination assembly includes two stand off sensors 711 and 713 and a magnetometer 712. The spatial configuration of the standoff sensors and magnetometers is shown in FIG. 12.

Figure 13:
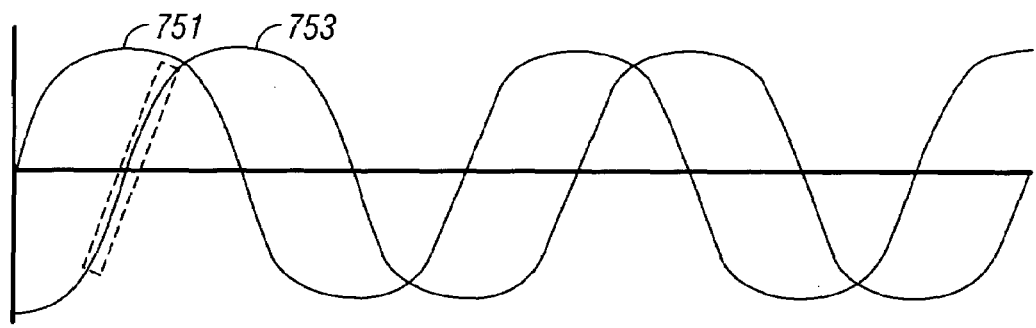
FIG. 13 shows measurements that would be made by two orthogonal magnetometers as a function of tool rotation in a vertical borehole.

FIG. 13 shows idealized magnetometer measurements 751, 753 that would be made by two magnetometers (referred to as x- and y-) magnetometers. These may be referred to as the $B_x$ and $B_y$ measurements. In a vertical borehole, the two magnetometer output should be a sinusoid. The magnetometers make measurements of a magnetic toolface angle that is responsive to the component of the earth's magnetic field along the sensitive axis of the magnetometer. In a deviated borehole, using known relations, the magnetic toolface angle can be converted to a high side toolface angle indicative of rotation of the tool about a longitudinal axis.

Figure 14:
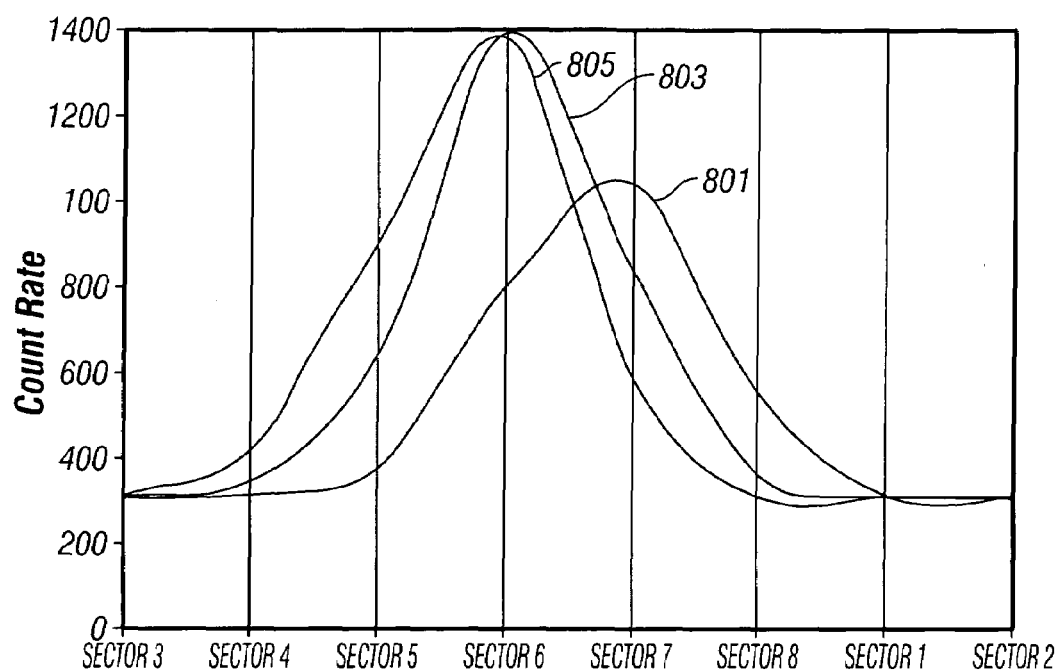
FIG. 14 shows the effect of rotation speed on nuclear measurements made with an exemplary sensor assembly.

Turning now to FIG. 14, an example of data recorded using density sensors on a rotating drillstring are shown. Processed data from eight azimuthal sectors, each 45° in size, are shown. Measurements made by nuclear sensors are statistical in the sense that they are dependent upon nuclear interactions such as scattering that can be described only in a statistical sense. For the data in FIG. 14, the source was in sector 7. The curve 801 gives the measured counts averaged over a number of rotations of the drillstring when the drillstring was rotating at 20 rpm. As can be seen, the measured count peaks at sector 7 (as it should) and the spread in the count is a measure of the resolution of the tool. When the rotation speed is increased to 125 rpm, the results are denoted by 803 and show that the peak count is not in sector 7 (as it should be) but occurs in sector 6. When the rotation speed is increased to 200 rpm, the peak count for the curve 805 is displaced closer towards sector 5. One cause of these erroneous measurements is a time delay in the electronics. In addition to the shift in the sector, it can be seen that the absolute counts are also quite different with the higher rotational speeds. This can give an erroneous interpretation of the magnitude of possible azimuthal variations of formation property.

Figure 15:
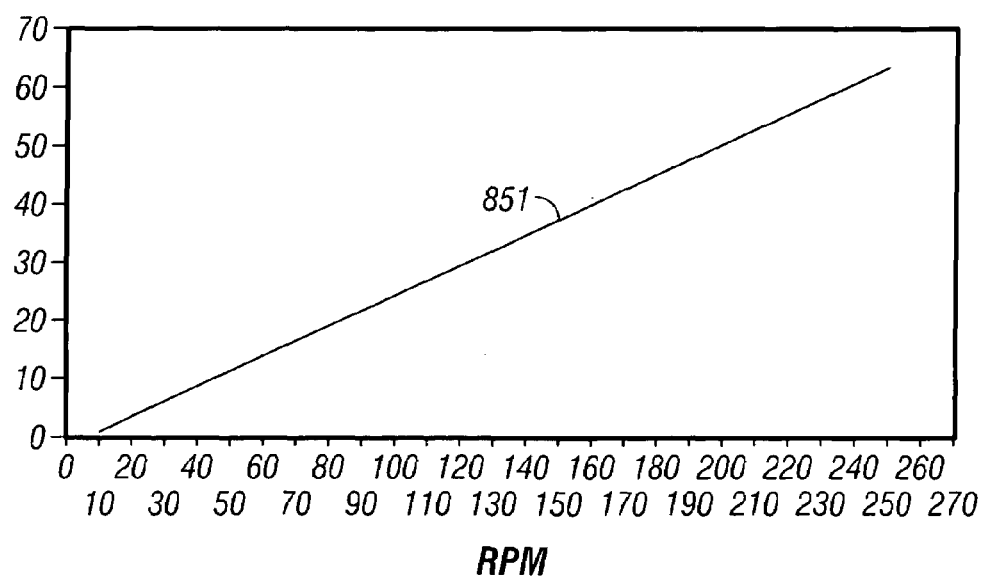
FIG. 15 shows simulated results of error in azimuth determination as a function of rotation speed.

Turning now to FIG. 15, shown is a simulated error 851 as a function of rotational speed of a uniformly rotating tool for a fixed time delay between the time azimuth measurements are made and the time at which they are matched up with a processor that processes the output of the nuclear sensors. This explains to a large part the shift in the peak values shown in FIG. 14. The spread in the measurements is, on the other hand, due to the statistical nature of the nuclear measurements. The abscissa is the rotation speed in rpm while the ordinate is the error in degrees. At 200 rpm, the error can be over 45° (or one sector). It should be noted that similar shifts would be observed with any kind of downhole azimuthal sensor measurements, such as resistivity measurements, nuclear magnetic resonance measurements, natural gamma measurements, etc. However, the other measurements would not show the statistically caused spread in the measurements observed with nuclear measurements.

Figure 16A:
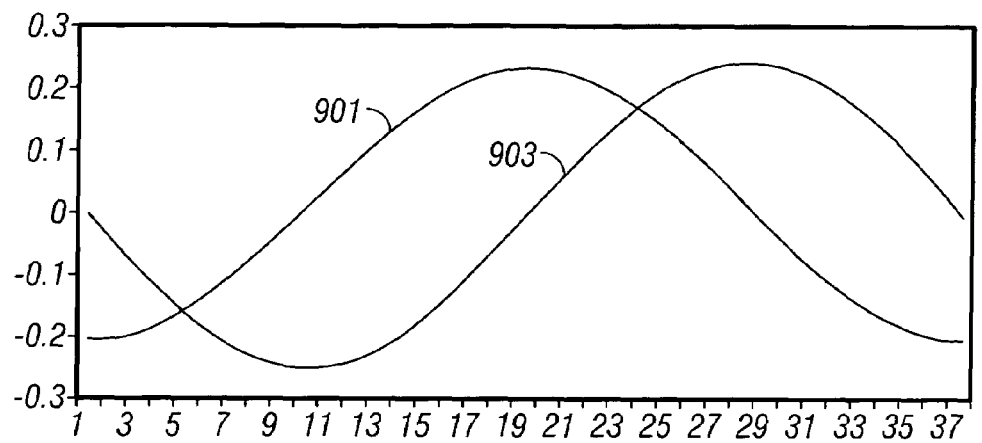
FIGS. 16a and 16b show the outputs of two orthogonal magnetometers on a rotating bottom hole assembly, and an error in the magnetometer measurements.
Figure 16B:
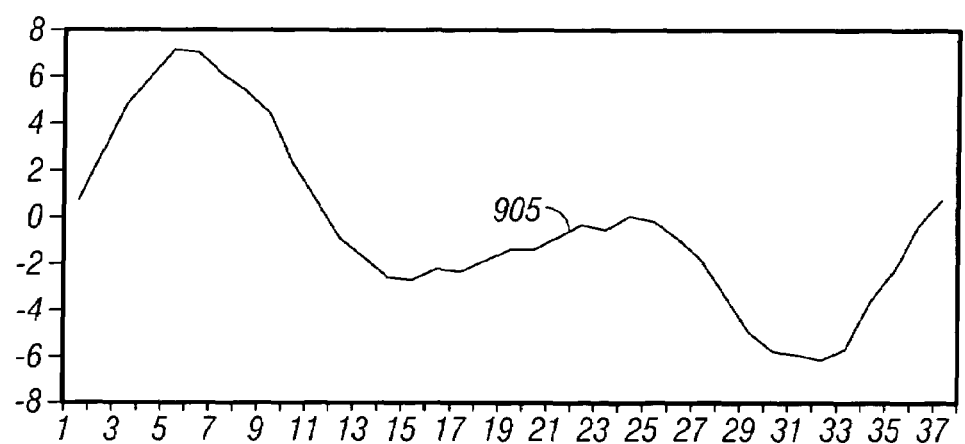

In reality, the rotational speed may not be uniform. The cause for non-uniform rotational speed are numerous, and includes the phenomenon known as stick-slip, wherein the drillbit sticks, and then resumes rotation intermittently. An example of what could be observed is shown in FIGS. 16*a* and 16*b*. Shown in FIG. 16*a* are simulated outputs from x- and y- magnetometers. The abscissa is the rotational angle in tens of degrees and the ordinate is a magnetometer output. FIG. 16*b* shows error 905 in degrees for one of the sensors. There are numerous sources of error that are included.

Figure 17:
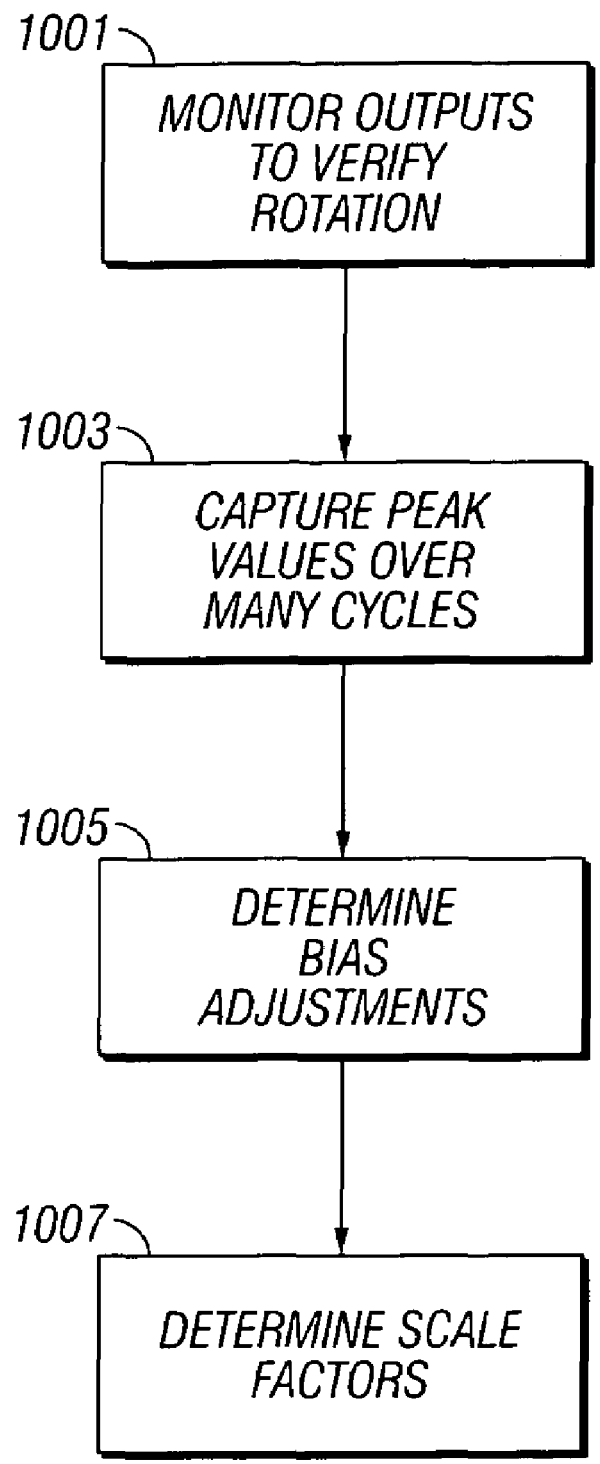
FIG. 17 shows a flow chart of an embodiment of the invention for correcting for errors resulting from use of the magnetometer measurements.

One source of error is the non-uniform rotation of the sensor assembly. Another source of error is a bias in the magnetometer readings. The bias could be caused by the drill collar, eddy currents, magnetically permeable metal in the vicinity of the magnetometers. In the present invention, the errors are removed by using a methodology outlined in FIG. 17. A check is made of the magnetometer outputs to verify that rotation is occurring 1001. Rotation can be confirmed by several techniques previously known in the art, including counting zero-crossings, counting peaks, computing an FFT and determining a fundamental frequency of a minimum amplitude in an expected range, or fitting a sinusoid to the sampled data within certain bounds. The outputs are accumulated over an appropriate period of time (or number of cycles or rotation and the average value is determined 1003. This is done separately for the $B_x$ and $B_y$ measurements and gives a bias value that is then subtracted 1005 from the magnetometer measurements. A scale factor is then determined relating the magnitudes of the sinusoids for the $B_x$ and $B_y$ components 1007. This is based on the assumption that the $B_x$ and $B_y$ measurements are exposed to the same external field and that they are primarily seeing the component of the earth's magnetic field in the radial direction (perpendicular to the tool axis). A check is made to make sure that the adjustments are within acceptable tolerances for changes and the rate of change. In open hole (with no local magnetic gradient), the compensated magnetometer should produce sinusoidal outputs while rotating at constant speed. A check of this condition can include fitting a sinusoid to the X and Y readings, respectively, and verifying sufficiently adequacy of the fit. If the presence of a significant gradient is indicated, the bias compensation routine can be delayed until drilling advances the sensor to a "clean" section of the wellbore.

A shift in the determined angle based on a nominal rotational speed (see FIG. 15) is then applied to the bias-corrected, scaled $B_x$ and $B_y$ measurements. Correcting both the bias and scale factor is required to avoid distortion of the derived toolface angle. The magnetic toolface angle is determined by $\tan^{-1}(B_y/B_x)$.

Figure 18:
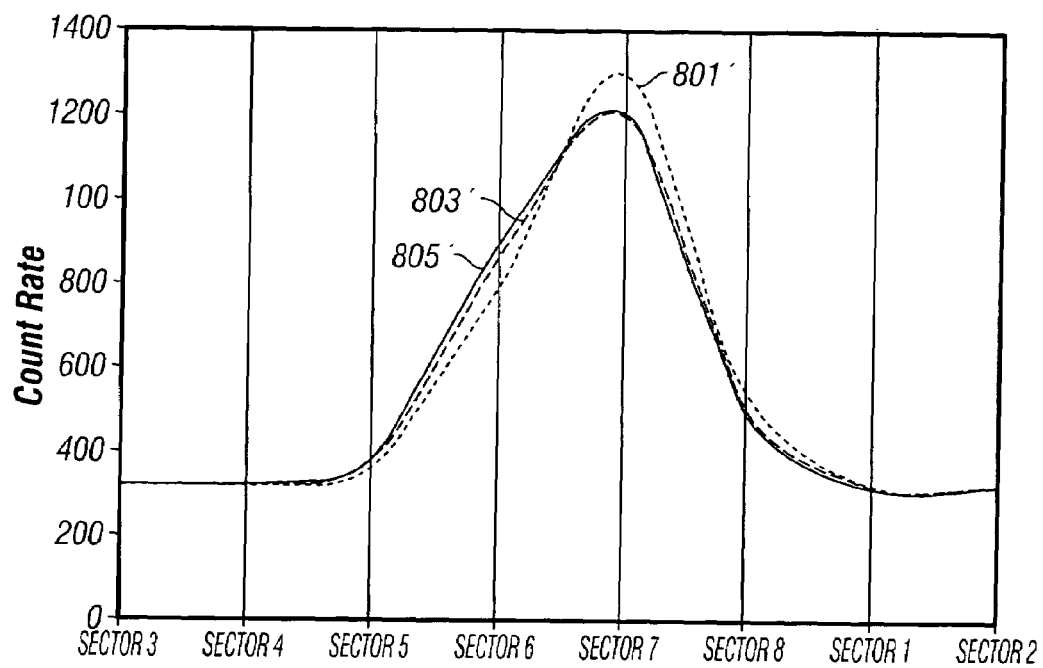
FIG. 18 shows corrected measurements corresponding to FIG. 14 using the method of the present invention.
Figure 19:
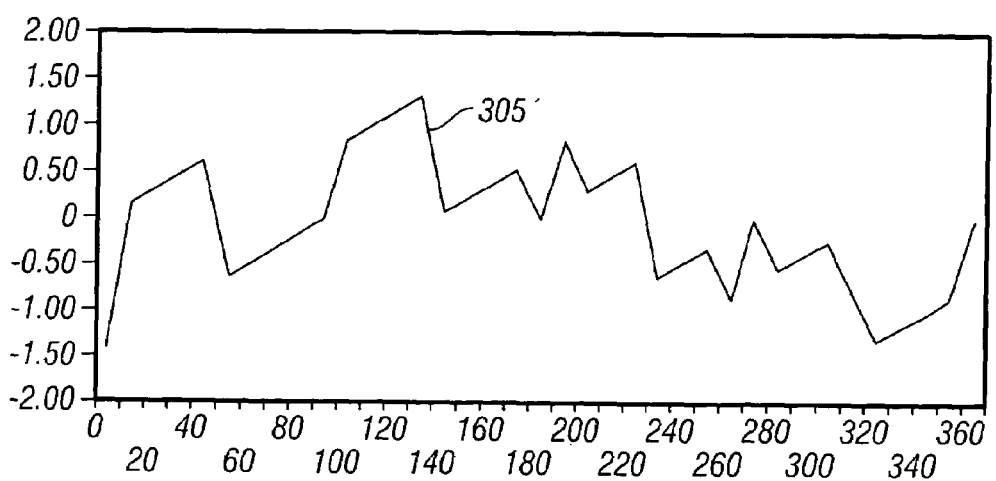
FIG. 19 shows an example of residual errors in use of the magnetometer outputs using the method of the present invention.

Turning now to FIG. 18, a plot is shown of counts by sector after applying the corrections. Comparing with FIG. 14, it can be seen that the curves 803' and 805' do not show an azimuthal shift relative to the curve 801' (the lowest rotational speed). It is also seen that the magnitudes of the curves are higher speed are not much different from the magnitude at lower speed. This will give a better azimuthal image than would be obtained by data corresponding to FIG. 4.

The improvement in imaging capabilities also applies to other formation evaluation sensors. For example, prior art methods use resistivity sensors for obtaining a resistivity image of the borehole wall. Bedding of the earth formation is commonly indicated by resistivity contrasts, so that by fitting sinusoids to the resistivity image, an apparent dip (and strike direction) of the bedding to the borehole axis can be obtained. Absolute dip and strike can then be inferred from survey information. In the presence of non-uniform rotation, the sinusoidal curve fitting can be a problem. With the method of the present invention, compensation is made for errors in the toolface angle, resulting in improved determination of bedding.

Another feature of the present invention is the selection of the low-pass filter used for the A/D converter for the magnetometer data. The angular error curve shown in FIG. 6*b* had a 50 Hz low pass filter applied to the magnetometer data. This is believed to be too restrictive. Shown in FIG. 9 is the angular error curve of the magnetometer data after applying the process discussed with respect to FIG. 7 and with a 250 Hz low pass filter for the A/D converter. The magnitude of the error is typically less than 1° compared to values as large as 6° in FIG. 7.

Figure 20:
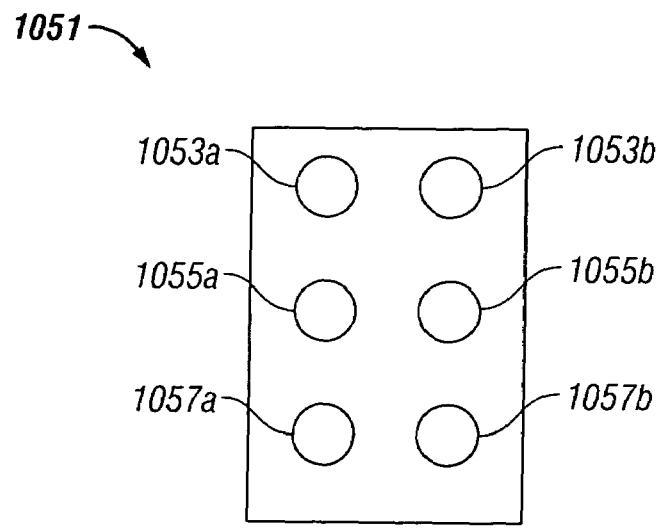
FIG. 20 shows an arrangement of pad mounted resistivity sensor

The method of the present invention has been discussed above with respect to a gamma ray logging tool. However, the method of the present invention may also be used with any kind of logging tool having a sensitivity that is dependent upon the toolface angle. FIG. 20 illustrates the arrangement of a plurality of resistivity sensors on a single pad 1051. Such a configuration is discussed in U.S. Pat. No. 6,173,794 to Thompson et al. The electrodes are arranged in a plurality of rows and columns: in FIG. 20, two columns and three rows are shown, with the electrodes identified as 1053*a*, 1053*b*, 1055*a*, 1055*b*, 1057*a* and 1057*b*. Having a plurality of columns increases the azimuthal resolution of resistivity measurements while having a plurality of rows increases the vertical resolution of resistivity measurements. Resistivity measurements are different from nuclear measurements in that there is little or no statistical variation in the measurements. Consequently, the measurements are made substantially instantaneously and thus have a higher resolution in azimuthal angle than nuclear measurements.

A variety of resistivity sensors is disclosed in U.S. patent application Ser. No. 10/657,870 of Ritter et al., having the same assignee as the present application and the contents of which are incorporated herein by reference. Ritter teaches an apparatus and method of obtaining a resistivity image of a borehole during drilling operations. A resistivity sensor is maintained at a specified standoff from the borehole wall. A processor uses measurements from an orientation sensor on the resistivity sub for determining a toolface orientation during continued rotation. The resistivity sensor may be mounted on a pad, rib, or a stabilizer. The resistivity sensor may be galvanic and may include suitable focusing, guard and monitor electrodes. A variety of focusing techniques may be used. A processor, preferably downhole, may be used for maintaining a substantially constant power consumption. The orientation sensors may be a magnetometer, an accelerometer, or a gyroscope. In oil based mud, capacitive coupling may be used. Multifrequency measurements may be used in combination with known frequency focusing techniques. Ritter also teaches the use of non-galvanic sensors for making resistivity measurements.

The method of the present invention may also be used with measurements made with resistivity sensors having transverse induction coils such as that described in U.S. Pat. No. 6,147,496 of Strack et al., the contents of which are incorporated herein by reference.

The method of the present invention may also be used with the apparatus described in U.S. patent application Ser. No. 10/616,857 of Chemali et al. The apparatus disclosed therein inclues a rotatable drill collar, and may include at least one extendable stabilizer joined to the drill collar, at least one transmitter for injecting at least one RF signal into the formation, and at least one receiver for measuring the phase and attenuation of the RF signal upon propagation through the formation. The at least one receiver and the transmitter define a plurality of transmitter-receiver spacings. A hardfacing enables a specified standoff of the stabilizer from the borehole wall. Rate of penetration of the drill collar can be determined using for instance, an axial accelerometer, or a second resistivity sensor placed at a different axial position. A plurality of directional sensors may be used, each of which preferably has its own associated processor connected to the common bus.

Figure 21:
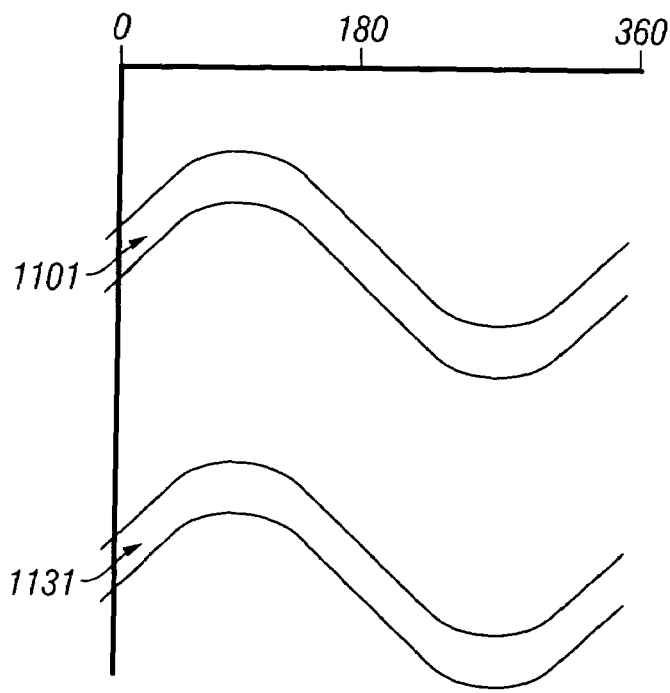
FIG. 21 shows unwrapped resistivity measurements as a function of time.
Figure 21:
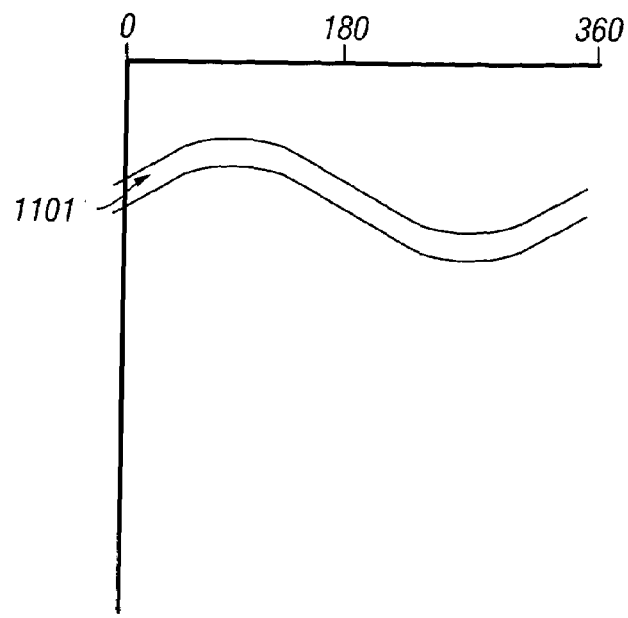

As taught by Thompson et al., the method of processing of the acquired data from any one of these arrangements of formation sensors is discussed with reference to FIGS. 21–22. For illustrative purposes, FIG. 21 illustrates the "unwrapped" resistivity data that might be recorded by a first resistivity sensor rotating in a borehole as the well is being drilled. The abscisa has values from 0° to 360° corresponding to azimuthal angles from a reference direction determined by a directional sensor. The vertical axis is the time of measurement. As the resistivity sensor rotates in the borehole while it is moved along with the drill bit, it traces out a spiral path. Indicated in FIG. 21 is a sinusoidal band 1131 corresponding to, say, a bed of high resistivity intersecting the borehole at a dipping angle.

In one embodiment of the invention, a downhole processor uses the depth information from downhole telemetry available to the telemetry device and optionally sums all the data within a specified depth and azimuth sampling interval to improve the S/N ratio and to reduce the amount of data to be stored. A typical depth sampling interval would be one inch and a typical azimuthal sampling interval is 15°. Another method of reducing the amount of data stored would be to discard redundant samples within the depth and azimuth sampling interval. Those versed in the art would recognize that a 2-D filtering of the data set by known techniques could be carried out prior to the data reduction. The data after this reduction step is displayed on a depth scale where the vertical axis is now depth and the horizontal axis is still the azimuthal angle with respect to a reference direction. The dipping resistive bed position is indicated by the sinusoid 1101'. Such a depth image can be obtained from a time image if at times corresponding to measurements such as 1101 and 1103, the absolute depth of the resistivity sensor were known.

Those versed in the art would recognize that a apparent dip angle between the bed boundaries and the borehole axis is readily determinable from the amplitude of the sinusoid 1101' and the diameter of the borehole. The apparent dip angle is the angle seen in a borehole when the borehole is an angle other than the strike angle of an interface. Given an apparent dip angle, strike direction, the borehole inclination and azimuth, the relative dip angle can be determined. The borehole inclination and azimuth are obtained, for example, from gyro measurements. For the determination of this amplitude, it is not essential to have exact depth measurements: it is sufficient to know the rate of penetration (ROP) during the time period that the sinusoid 1101' is being measured. A rate of penetration may be obtained using accelerometer measurements such as that disclosed in U.S. patent application Ser. No. 10/167,332 of Dubinsky et al., having the same assignee as the present invention and the contents of which are fully incorporated herein by reference. As disclosed in Dubinsky, one of several methods may be used for determination of ROP. These include identification of maxima and minima of velocity (obtained by integration of accelerometer measurements), average acceleration magnitude and an instantaneous frequency of measurements.

Alternatively, the ROP may be determined by measurements made with two axially spaced apart resistivity sensors. This is illustrated in FIG. 21 by a second resistivity band 1131 corresponding to the same dipping band 1101 as measured at a second resistivity sensor directly above the first resistivity sensor. The spacing between the first and second resistivity sensors being known, a rate of penetration is computed by the microprocessor by measuring the time shift between the bands 1101 and 1131. The time shift between the bands 1101 and 1131 could be determined by one of many methods, including cross-correlation techniques. This knowledge of the rate of penetration serves as a check on the depth information communicated downhole and, in the absence of the downhole telemetry data, can be used by itself to calculate the ROP and apparent dip. This method is particularly useful in highly deviated boreholes, or in any situation where the apparent dip angle is large, so that a single resistivity sensor would not see the entire sinusoid.

Alternatively a hypothetic apparent dip value may be computed downhole for an assumed ROP and sent to the surface by the telemetry device. The corrected dip value is provided by the surface system by taking into account the ratio between the assumed ROP value from the downhole processor and the actual ROP measured at the surface.

In the method taught by Thompson, the resistivity sensors are on a sleeve that is decoupled from the drill collar and is thus rotating quite slowly. Hence the problems discussed above with respect to stick slip motion of the drill string, non-uniform rates of rotation, and time delays between the time of measurements made by the orientation sensor and the resisitivy sensor. However, non-uniform rotation rate and the time delay would be a problem with the methods discussed by Ritter and with the methods discussed by Clark et al. If correction is not made for these effects, the unwrapped image of a formation boundary would be hard to interpret. This is illustrated in FIG. 22 in an exaggerated fashion.

Figure 23:
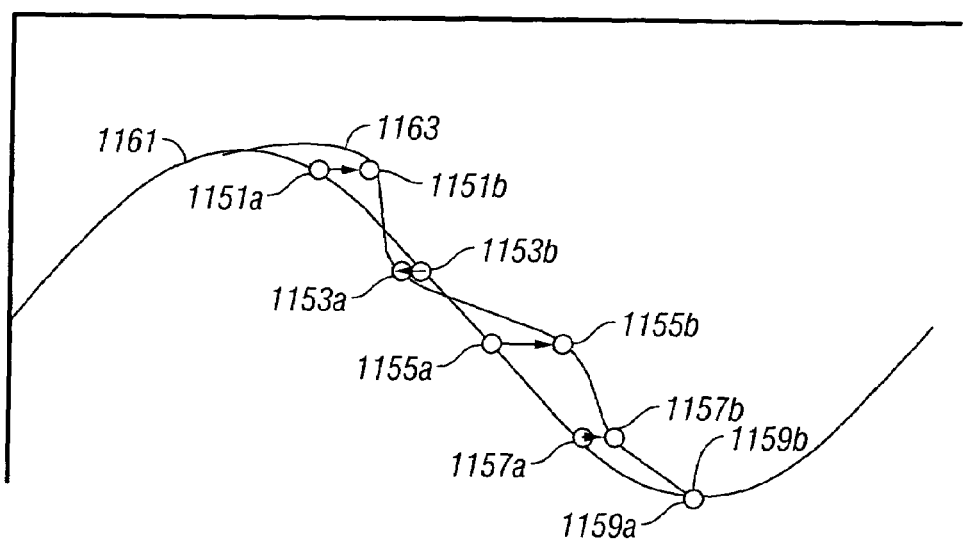
FIG. 23 is a schematic illustration of the appearance of a bed with irregular rotation of the drillstring.

Shown in FIG. 23 is a sinusoid 1161 corresponding to a bed boundary. Depicted along the sinusoid are exemplary positions 1151a, 1153a, 1155a, 1157a and 1159a at which a single sensor crosses the bed boundary. If the rate of rotation of the drillstring is non-uniform, then in the presence of a time delay between between the orientation and resistivity sensors, the sensor appears to cross the bed boundary at points denoted by 1151b, 1153b, 1155b, 1157b and 1159b, giving a curve 1163 that is not sinusoidal, so that prior art curve fitting techniques to identify the dip of a bed boundary would not work. When the ROP is small, the effect of the non-uniform rotation is to reduce the resolution of the bed boundary.

Figure 24:
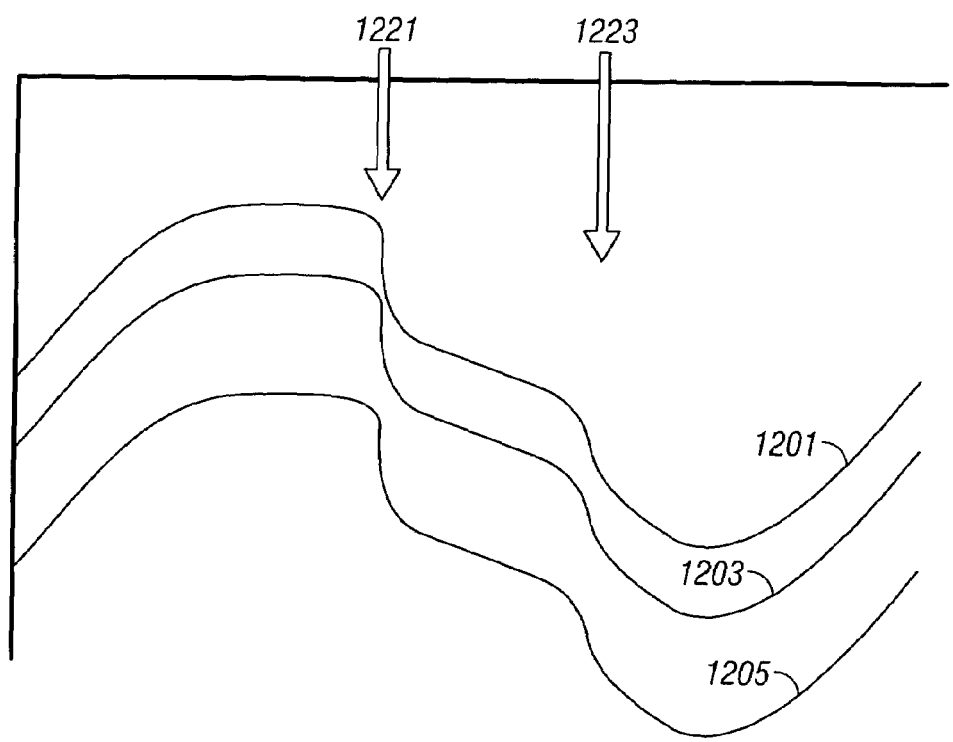
FIG. 24 is a schematic illustration of an image having a number of boundaries with possible stick-slip.

In another embodiment of the invention, image correction may be made and possible stick-slip may be identified. This is schematically illustrated in FIG. 24. Shown in FIG. 24 are three interfaces 1201, 1203 and 1205 as they would appear if no correction is made. The regions 1221 and 1223 correspond to orientations where there is possible sticking during rotation of the drillstring. Applying the method of the present invention, these irregular curves would be sinusoids. The images are not limited to resistivity measurements—they could be images obtained by any prior art borehole imaging tool including acoustic images, density images or porosity images.

Figure 25:
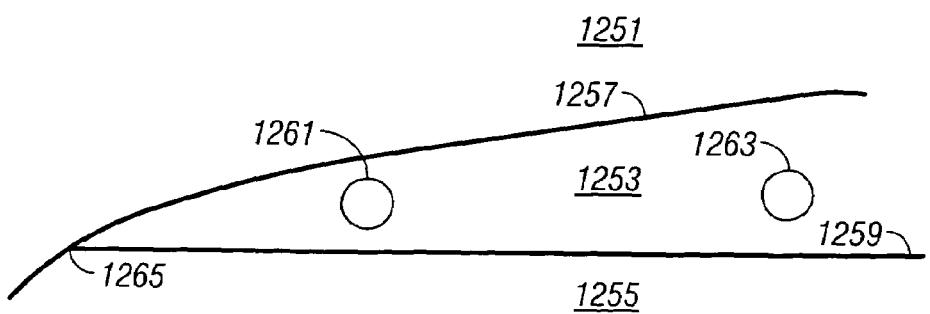
FIGS. 25a, 25b illustrate the use of the present invention for reservoir navigation.
Figure 25B:
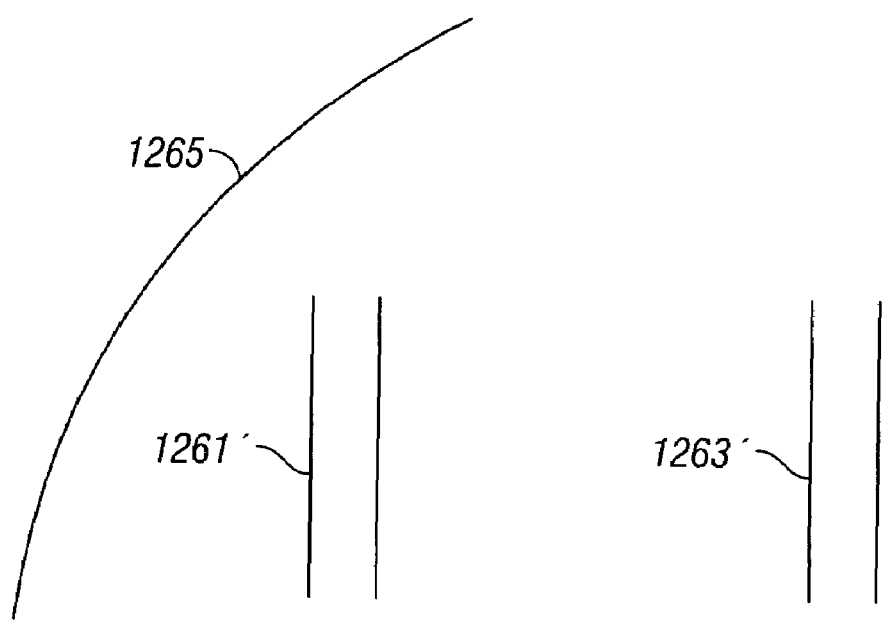

The method of the present invention may be used in reservoir navigation wherein the objective is to maintain the borehole in a specific relation to a fluid interface and/or a caprock. This is schematically illustrated in FIGS. 25*a* and 25*b*. Shown in FIG. 25*a* is a vertical section through a reservoir having a caprock 1251, oil zone 1253 and water zone 1255. The top of the reservoir is indicated by 1257 while the oil-water contact is indicated by 1259. Also shown are two exemplary boreholes by 1261 and 1263.

FIG. 25*b* is a simplified plan view of FIG. 25*a* with the wells denoted by 1261' and 1263'. Also shown by 1265 is the edge of the oil bearing portion of the formation—the curved portion of 1265 at the top of FIG. 25*b* being an indication that the reservoir is pinching out. Keeping in mind the fact that resistivity sensors are able to see some distance into the formation, measurements made in wellbore 1263 will generally be featureless unless the borehole is getting too close to either the caprock or to the oil-water contact. When the borehole approaches either the caprock, some change in resistivity will be picked up in the top portion of the sinusoid whereas if the borehole approaches the oil-water contact, some decreased resistivity will show up on the bottom portion of the sinusoid. In either case, the image will be symmetrical.

On the other hand, in wellbore 1261, these same features will appear to be asymmetrical with respect to the up and down directions due to the pinching out of the reservoir. Detection of such features clearly requires an accurate determination of the toolface angle.

The method of the present invention may also be used with wireline logging tools. When used with wireline tools, a motor is needed for rotating the assembly through different toolface angles so as to provide adequate sampling over the circumference of the borehole. The wireline tools may be run open hole or, in case of certain types of sensors such as gamma ray sensor, in cased hole. A slickline sensor assembly may also be used within a drillstring for some types of measurements.

While the foregoing disclosure is directed to specific embodiments of the invention, various modifications will be apparent to those skilled in the art. It is intended that all variations within the scope and spirit of the appended claims be embraced by the foregoing disclosure.

What is claimed is:

1. An apparatus for use on a bottom hole assembly (BHA) for conveying in a borehole in an earth formation, the apparatus comprising:
   (a) an orientation sensor making measurements indicative of a toolface angle of said BHA during rotation of the BHA;
   (b) at least one directionally sensitive formation evaluation sensor for making measurements of a property of said earth formation during said continued rotation; and
   (c) a processor which estimates from said directionally sensitive measurements and said orientation sensor measurements a local spatial characteristic of said earth formation wherein said BHA has a non-uniform rate of rotation.

2. The apparatus of claim 1 wherein said local spatial characteristic comprises a dip of a bed boundary.

3. The apparatus of claim 1 wherein said local spatial characteristic comprises a dip of an oil-water contact.

4. The apparatus of claim 1 wherein said at least one directionally sensitive formation evaluation sensor comprises two directionally sensitive formation evaluation sensors spaced apart along an axial direction of said BHA.

5. The apparatus of claim 4 further comprising a processor for determining from measurements made by said two directionally sensitive formation evaluation sensors a rate of penetration of said BHA.

6. The apparatus of claim 1 wherein the at least one directionally sensitive formation evaluation sensor comprises a galvanic resistivity sensor.

7. The apparatus of claim 6 wherein said galvanic sensor comprises a focused sensor.

8. The apparatus of claim 1 wherein said at least one directionally sensitive formation evaluation sensor comprises an induction sensor.

9. The apparatus of claim 8 wherein said induction sensor comprises a sensor having a coil with an axis inclined to an axis of said BHA.

10. The apparatus of claim 1 wherein said at last one directionally sensitive formation evaluation sensor comprises a resistivity sensor having a plurality of transmitter-receiver spacings and further comprises circuitry for measuring at least one of (i) an amplitude difference, and, (ii) a phase difference of signals measured at said plurality of spacings.

11. The apparatus of claim 1 wherein said orientation sensor is associated with a first processor and said at least one resistivity sensor is associated with a second processor, said first and second processors being on a common bus.

12. The apparatus of claim 1 wherein said orientation sensor comprises at least one of (i) a magnetometer, (ii) an accelerometer, and, (iii) a gyrsocope.

13. The apparatus of claim 1 further comprising a sensor for providing a measurement indicative of an inclination and azimuth of said borehole.

14. The apparatus of claim 13 wherein said sensor for providing a measurement indicative of an inclination and azimuth of said borehole comprises a gyroscope.

15. The apparatus of claim 1 wherein said processor further determines a bias in said orientation measurements.

16. The apparatus of claim 1 wherein said at least one directionally sensitive formation evaluation comprises a resistivity sensor mounted on one of (i) a pad, (ii) a rib, and, (iii) a stabilizer.

17. The apparatus of claim 1 wherein said processor further constructs and corrects an image of said borehole.

18. The apparatus of claim 1 wherein said processor further controls a drilling direction of said borehole based on said local spatial characteristic of said earth formation.

19. The apparatus of claim 1 wherein said processor determines said local spatial characteristic of said earth formation based on an apparent rate of penetration of the BHA.

20. The apparatus of claim 1 wherein said directionally sensitive formation evaluation sensor is selected from the group consisiting of (i) a resistivity sensor, and, (ii) a nuclear sensor.

21. The apparatus of claim 1 wherein said local spatial characteristic of said earth formation is selected from the group consisting of (i) a dip of an interface in said earth formation, and, (ii) an image of a wall of said borehole.

22. A method of estimating a local spatial characteristic of an earth formation, the method comprising:
(a) conveying a bottom hole assembly (BHA) into a borehole in an earth formation;
(b) using an orientation sensor on said BHA for making measurements indicative of a toolface angle of said BHA during continued rotation of the BHA;
(c) using a first directionally sensitive formation valuation sensor on said BHA for making measurements indicative of of said local spatial characteristic of said earth formation during said continued rotation; and
(d) estimating the local spatial characteristic of the earth formation using said measurements of said directionally sensitive formation evaluation sensor and said orientation sensor measurements, said estimation correcting for a non-uniform rate of rotation of said BHA.

23. The method of claim 22 further comprising using said determined local spatial characteristic for controlling a drilling direction of said borehole.

24. The method of claim 22 wherein said Local spatial characteristic comprises a apparent dip angle between an axis of said borehole and a bed boundary in said earth formation.

25. The method of claim 22 wherein determining said local characteristic further comprises using measurements from a second directionally sensitive formation evaluation sensor spaced apart axially from said first directionally sensitive formation evaluation sensor.

26. The method of claim 22 wherein the first directionally sensitive formation evaluation sensor comprises a galvanic sensor.

27. The method of claim 26 wherein said galvanic sensor comprises a focused sensor.

28. The method of claim 22 wherein said first directionally sensitive formation evaluation sensor comprises an induction sensor.

29. The method of claim 28 wherein said induction sensor comprises a sensor having a coil with an axis inclined to an axis of said BHA.

30. The method of claim 22 wherein said first directionally sensitive formation evaluation sensor comprises a resistivity sensor with a plurality of transmitter-receiver spacings, and using said resistivity sensor further comprises making measurements of at least one of (i) and amplitude difference, and, (ii) a phase difference of signals measured at said plurality of spacings.

31. The method of claim 22 further comprising coupling a first processor associated with said orientation sensor and a second processor associated with the first directionally sensitive formation evaluation sensor to a common bus.

32. The method of claim 22 wherein said orientation sensor is selected from the group consisting of: (i) a magnetometer, (ii) an accelerometer, and, (iii) a gyroscope.

33. The method of claim 22 further comprising using an additional sensor for providing a measurement indicative of an inclination and azimuth of said borehole.

34. The method of claim 22 further comprising determining a bias in said orientation measurements.

35. The method claim 22 wherein said first directionally sensitive formation evaluation sensor is mounted on one of (i) a pad, (ii) a rib, and, (iii) a stabilizer.

36. The method of claim 22 further comprising obtaining an image of said borehole.

37. The method of claim 36 further comprising correcting said image.

38. The method of claim 36 further comprising identifying tool face angles associated with a sticking of the BHA.

39. The method of claim 22 wherein said directionally sensitive formation evaluation sensor is selected from the group consisiting of (i) a resistivity sensor, and, (ii) a nuclear sensor.

40. The apparatus of claim 22 wherein said local spatial characteristic of said earth formation is selected from the group consisting of (i) a dip of an interface in said earth formation, and, (ii) an image of a wall of said borehole.

41. The method of claim 22 further comprising altering a direction of drilling of said BHA based at least in part on said estimated local spatial characteristic of said earth formation.

* * * * *